June 1, 1943.        P. FROST        2,320,722
MAGAZINE LOADED WITH DIFFERENT SORTS OF FILMS
Filed Sept. 12, 1940        2 Sheets-Sheet 1
FIG. 1
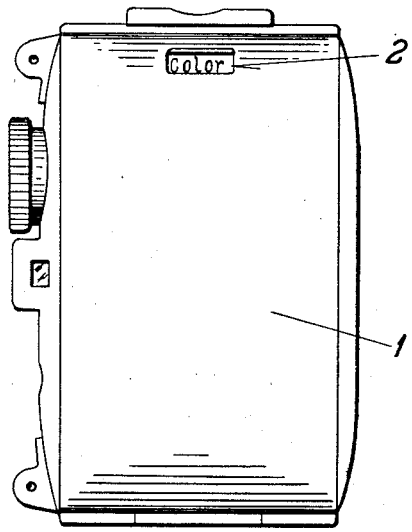
FIG. 2
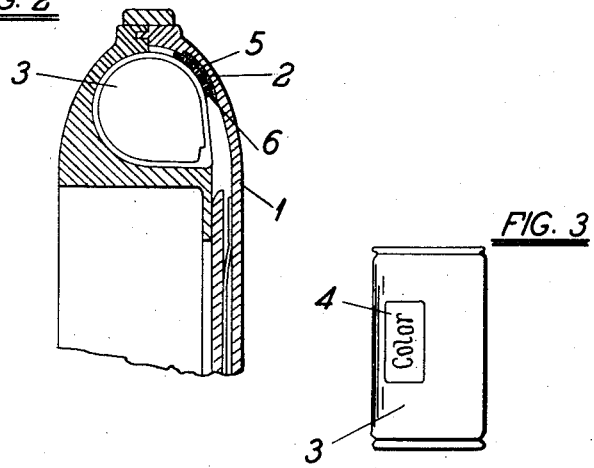
FIG. 3
PAUL FROST
INVENTOR
BY *Philip D. Hopkins*
*William C. Babcock*
ATTORNEYS June 1, 1943.                P. FROST                2,320,722
MAGAZINE LOADED WITH DIFFERENT SORTS OF FILMS
Filed Sept. 12, 1940          2 Sheets-Sheet 2
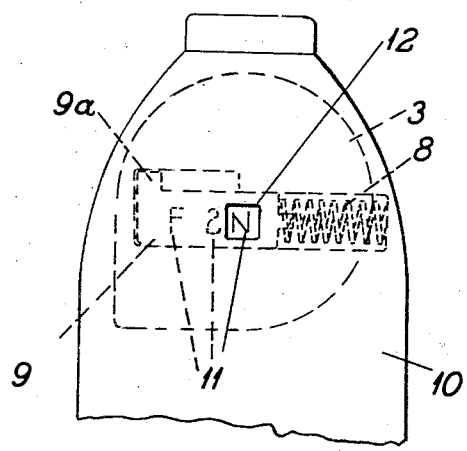
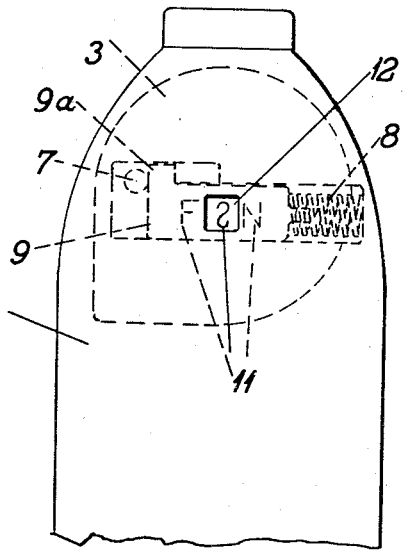
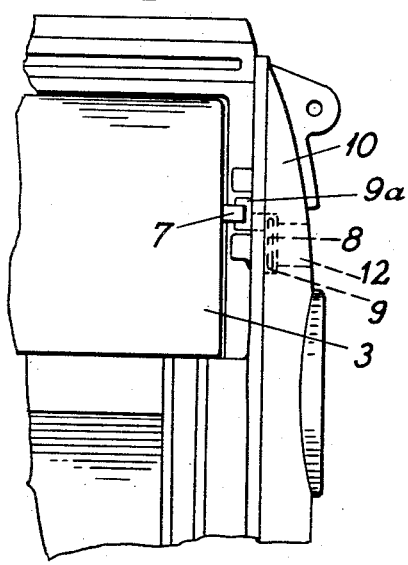
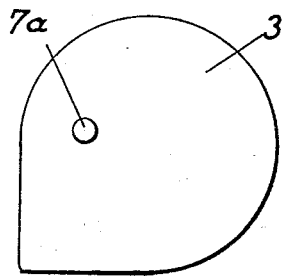
PAUL FROST
INVENTOR
BY
ATTORNEYS Patented June 1, 1943

2,320,722

UNITED STATES PATENT OFFICE 2,320,722

MAGAZINE LOADED WITH DIFFERENT SORTS OF FILMS

Paul Frost, Munich, Germany; assignor to General Aniline & Film Corporation, New York, N. Y., a corporation of Delaware Application September 12, 1940, Serial No. 356,443
In Germany July 5, 1939

5 Claims. (Cl. 116—114)

This invention relates to magazines loaded with different sorts of films.

On account of the highly developed emulsion technic it was necessary to find means for reading off from the outside with what sort of films the camera has been loaded. This precaution is necessary, since the different films on the market possess different latitude and sensitivity. Especially as far as miniature cameras are concerned which usually contain about 36 pictures, seldom all 36 pictures are exposed at once. Usually quite a space of time will elapse between the single exposures. For this reason it is absolutely necessary to distinguish the contents of the loaded film magazine, since otherwise the amateur forgets only too easily with what film the camera has been loaded. Mistakes are thereby caused and time and material very often lost, when the camera is opened unintentionally.

The present invention has as one object the provision of a photographic rollfilm camera having novel means of distinguishing the different types of films loaded therein.

Another object is the provision of a new type of film magazine.

Other objects will be apparent from the following specification.

According to the present invention means are provided on the magazine as well as on the camera which allow always a control of the different sorts of films contained in the locked camera. It is especially practical to provide the rollfilm magazine with a marking label and to mount in the camera opposite the label a light-tight inspection window. The rollfilm magazine may be equipped also with a pin differently arranged on the outside of the magazine according to the type of film contained therein. This pin automatically adjusts a sliding mark mounted on the camera, whereby said sliding mark is under the tension of a spring. On account of this arrangement the photographer is not forced to put down in writing which film he has inserted into the camera, since he can always read off even after a long period which type of film has been loaded into his camera.

The drawings exemplify two different forms of construction according to the present invention.

Figure 1 is a rear elevation of the camera with an inspection window in the magazine chamber.

Figure 2 is a side elevation of the camera film magazine with a magazine loaded therein.

Figure 3 is a single view of a magazine with a marking label thereon.

Figure 4 represents another form of construction, whereby an elastic slide marks the type of film contained in the magazine. In the present case the mark signifies a normal film.

Figure 5 shows the same form of construction as in Figure 4 for a specially high sensitive film, the magazine of which carries a marking pin.

Figure 6 is a side view of the construction according to Figure 4.

Figure 7 represents a single view of a rollfilm magazine with a marking pin in changed position as compared with Figure 4, for instance in the position for a color film.

Referring first to Figures 1, 2 and 3 in the rear side 1 of the camera there is provided an inspection window 2 through which can be read off the marking label 4 mounted on the magazine 3. Instead of the label the magazines may be provided with a suitable printing. In the window 2 there is a shield 5 made of red or green glass which prevents the actinic light from penetrating into the inside of the camera. The window 2 may be framed on the inside by a velvet framing 6. The window 2 may be arranged also in the side wall of the camera 1. In this case, however, the label 4 must be also arranged on the side wall of the magazine.

Figures 4–7 inclusive show a different type of construction according to the present invention. The magazine 3 possesses a marking pin 7, 7a. According to the contents of the magazine this pin is more or less shifted towards the middle of the magazine. These pins 7, 7a control a slide 9, 9a which stands under the effect of the spring 8 and is slidingly guided in the side wall 10 of the camera. When inserting the magazine 3 into the camera the slide 9 on which the different sorts of films are marked by the mark 11, is shifted so much to the side against the effect of the spring 8 by the shoulder 9a adjusted to the pin 7, until the mark of the slide 9 appears in the window 12. This mark indicates the type of film which has been employed. In Figure 4 there has been inserted into the camera, a magazine, the contents of which correspond to the norm with regard to exposure latitude and sensitivity. This magazine possesses no marking pin 7 or the like. Therefore the mark N (normal film) stands in the inspection window 12. If, however, a highly sensitive film is employed, the pin 7 shifts the slide 9 into the position as shown in Figure 5. If finally a color film is loaded into the camera, the pin 7a of the magazine 3 (see Figure 7) moves the slide 9 so much to the side, until the letter F appears in the window 12. Without difficulties it is possible to employ still other marks of distinction and to make them visible in the manner described.

What I claim is:

1. A camera for receiving light-tight supply magazines loaded with different types of film, a magazine with a given type of film for use in said camera, registering means on said camera, and means on said magazine cooperating with said camera means, said camera means and magazine means giving a visible indication of the type of film when said camera is closed with the magazine in operative position.

2. In combination, a camera for selectively receiving one of a plurality of light-tight film magazines, each containing a different type of film, registering means on said camera comprising a window cooperating with indicating means on the magazine when the same is operatively positioned in said camera for visibly indicating through said window the type of film in the magazine.

3. In combination, a camera for selectively receiving one of a plurality of light-tight film magazines each containing a different type of film, registering means on said camera comprising a window and an indicator cooperating with means on the magazine when the same is operatively positioned in said camera for adjusting said indicator with respect to said window to indicate through said window the type of film in the magazine.

4. In combination, a camera for selectively receiving one of a plurality of light-tight film magazines each containing a different type of film, registering means on said camera comprising a window and an indicator cooperating with means on the magazine when the same is operatively positioned in said camera for adjusting said indicator with respect to said window to indicate through said window the type of film in the magazine, said means on the magazine comprising a pin positioned thereon corresponding to the type of film in the magazine.

5. In combination, a camera for selectively receiving one of a plurality of light-tight film magazines, each containing a different type of film, registering means on said camera comprising a window and an indicator consisting of a spring-pressed movable member carrying film type designations thereon, said designations being visible through said window upon adjustment of said movable member, said movable member cooperating with a pin on the magazine positioned in accordance with the type of film in the magazine so that when the magazine is in an operative position in the camera the appropriate film type designation is visible through the window.

PAUL FROST.